(12) United States Patent
O'Brien et al.

(10) Patent No.: US 10,592,188 B2
(45) Date of Patent: Mar. 17, 2020

(54) CONTENT BUMPING IN MULTI-LAYER DISPLAY SYSTEMS

(71) Applicant: PURE DEPTH LIMITED, Auckland (NZ)

(72) Inventors: Austin F. O'Brien, Auckland (NZ); Vijay R. Prema, Mangere (NZ); Richard N. Mans, Ngaruawahia (NZ)

(73) Assignee: Pure Death Limited (NZ)

( * ) Notice: Subject to any disclaimer, the term of this patent is extended or adjusted under 35 U.S.C. 154(b) by 239 days.

(21) Appl. No.: 15/391,903

(22) Filed: Dec. 28, 2016

(65) Prior Publication Data

US 2018/0181287 A1   Jun. 28, 2018

(51) Int. Cl.
| | | |
|---|---|---|
| G06F 3/048 | (2013.01) | |
| G06F 3/14 | (2006.01) | |
| G06F 3/0488 | (2013.01) | |
| G06F 3/0482 | (2013.01) | |

(52) U.S. Cl.
CPC .......... *G06F 3/1423* (2013.01); *G06F 3/0482* (2013.01); *G06F 3/0488* (2013.01); *G06F 2203/04803* (2013.01); *G06F 2203/04804* (2013.01)

(58) Field of Classification Search
CPC ........ G06F 3/1423–1446; G09G 3/003; G09G 2300/23; G09G 2380/02; G09G 2340/10
See application file for complete search history.

(56) References Cited

U.S. PATENT DOCUMENTS

| | | | | |
|---|---|---|---|---|
| 8,887,043 B1* | 11/2014 | Pollack | ................ | G06F 3/0304 |
| | | | | 345/108 |
| 2006/0074984 A1* | 4/2006 | Milener | ............ | G06F 17/30876 |
| 2007/0252804 A1* | 11/2007 | Engel | ....................... | G09G 3/36 |
| | | | | 345/98 |
| 2009/0143141 A1* | 6/2009 | Wells | ....................... | G07F 17/32 |
| | | | | 463/37 |
| 2010/0302173 A1 | 12/2010 | Deng et al. | | |
| 2011/0134066 A1 | 6/2011 | Blumenberg et al. | | |
| 2011/0157051 A1* | 6/2011 | Shohga | .................... | G06F 3/041 |
| | | | | 345/173 |
| 2014/0198055 A1* | 7/2014 | Barkway | ............. | G06F 3/04886 |
| | | | | 345/173 |
| 2015/0378502 A1 | 12/2015 | Hu et al. | | |
| 2016/0012630 A1 | 1/2016 | Bell | | |

* cited by examiner

*Primary Examiner* — Claudia Dragoescu
(74) *Attorney, Agent, or Firm* — Craig A. Baldwin

(57) ABSTRACT

A multi-layer display system may include a plurality of display panels/screens arranged in an overlapping manner, a backlight configured to provide light to the plurality of display screens, and a processing system. The processing system may be configured to: display content (e.g., button or text) on a first display screen of the plurality of display screens, detect an input (e.g., touch) proximate the content, and responsive to the input move the content so that it is displayed at least on a different display screen/panel such as a further rearward screen/panel and/or a further forward screen/panel. This may, for instance, simulate the pressing of a button or the like in the case of moving content so that is becomes displayed on a further rearward screen/panel.

16 Claims, 12 Drawing Sheets

800

CONTENT BUMPING IN MULTI-LAYER DISPLAY SYSTEMS

BACKGROUND

Certain embodiments of this invention relate generally to multi-layer displays and, more particularly, to multi-layer display systems and methods for displaying content and moving displayed content between layers of the multi-layer display. In certain example embodiments of this invention, selected content (e.g., button and/or text) on a first display screen is pushed rearwardly so as to be displayed on a second display screen that is rearward of the first display screen with respect to a user. The selected content may be displayed on the second display screen at a location offset from where it was displayed on the first display screen, and/or in an enlarged manner compared to how it was displayed on the first display screen, in certain example embodiments of this invention.

Displays for displaying content are being included in many applications. For example, display systems are included in household appliances, mobile devices, vehicle displays, and wearable technology to name a few. Due to the size constraints of the displays and devices onto which they are provided, displayed content needs to be re-sized to fit the display screen.

When content (e.g., text and/or graphics) is resized, it often becomes difficult for a user to view the content or make selections of the displayed content (e.g., links or buttons). To address this issues, some applications provide for user controls to enlarge the displayed content.

For instance, conventional cell phones have a feature where an area proximate a finger touch is enlarged in an enlargement bubble on the screen to enable a user to see exactly which element is to be selected/touched. However, such enlargement bubbles are problematic because user fingers and/or such bubbles often overlay and thus hide surrounding text and graphics so that the user can lose context and misunderstand where exactly the touch is being applied and what is being selected.

Thus, conventional touch-based keyboards or interfaces often have a "magnifying lens" effect on pressed and held keys/areas. This is designed to help a user better see such keys/areas. However, the magnifying effect in conventional devices tends to block other content (e.g., keys or text) from the user's view, and may require a user to completely remove his or her finger from the area to adequately view and selected a desired button.

SUMMARY

Certain embodiments of this invention relate generally to multi-layer displays and, more particularly, to multi-layer display systems and methods for displaying content and moving displayed content between layers of the multi-layer display. In certain example embodiments of this invention, selected content (e.g., button and/or text) on a first display screen is pushed rearwardly so as to be displayed on a second display screen that is rearward of the first display screen with respect to a user. The selected content may be displayed on the second display screen at a location offset from where it was displayed on the first display screen, and/or in an enlarged manner compared to how it was displayed on the first display screen, in certain example embodiments of this invention.

Exemplary embodiments of this disclosure provide a display system that can display content on different display screens of a multi-layer display provided in a stacked arrangement. The content may be displayed on a first display screen that overlaps one or more other display screens, and in response to an input a portion of the content may be displayed (e.g., in an enlarged manner or otherwise) on another display screen that may be located rearwardly of the first display screen. Thus, the content (e.g., which may or may not be displayed in an enlarged content bubble or area) proximate the selected area of the first display screen is effectively pushed to another display screen that is rearwardly located relative to the first display screen, so that when displayed on the second display screen it is more easily viewable to a user and does not significantly hide content being displayed to the user on the front display screen/panel. The content may include text, images, buttons, links, and/or the like.

In an example embodiment of this invention, there is provided a multi-layer display system, comprising: a first display screen and a second display screen arranged in a substantially parallel manner, the first display screen overlapping the second display screen; wherein the multi-layer display system is configured so that the first display screen is to be located between a user and the second display screen; a processing system comprising at least one processor and memory, the processing system configured to: (a) display content on the first display screen; (b) detect an input to the first display screen; (c) determine an input location to the first display screen and content displayed on the first display screen proximate the input location; and (d) display, on the second display screen, at least some of the content that was proximate the input location.

In an example embodiment of this invention, there is provided a multi-layer display system comprising: a first display screen and a second display screen arranged in a substantially parallel manner in different planes, the first display screen overlapping the second display screen; processing circuitry configured to: (i) display content on the first display screen; (ii) detect an input to the first display screen; (iii) determine an input location of the input to the first display screen and content displayed on the first display screen proximate the input location; and (iv) display, on the second display screen, content relating to the content that was proximate the input location.

Other example embodiments of this invention relate to depth pulling in response to an input, and in particular pulling at least some displayed content forward toward a viewer in response to a user input. multi-layer display system, comprising: a first display screen and a second display screen arranged in a substantially parallel manner, the first display screen overlapping the second display screen; wherein the multi-layer display system is configured so that the first display screen is to be located between a user and the second display screen; a processing system comprising at least one processor and memory, the processing system configured to: display content on the second display screen; determine an input location and content displayed on the second display screen proximate an input location on the first display screen; and display, on the first display screen, at least some of the content that was on the second display screen proximate the input location. The content pulled forward may be removed from a rearward display screen and entirely moved to a front display screen for example, or alternatively may be displayed on both the front and rear screens in response to an input (as opposed to just on a rear screen), in various example embodiments of this invention.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Figure 1:
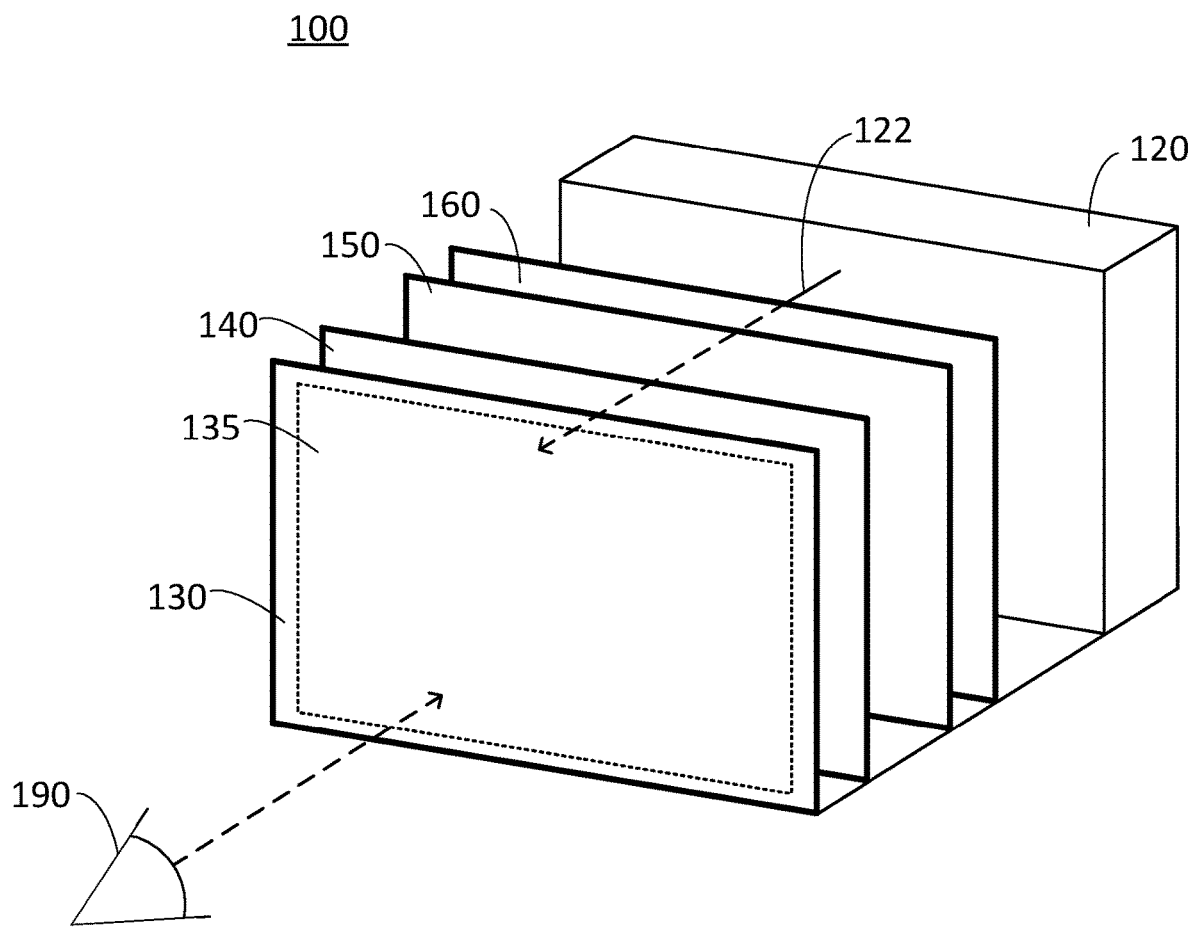
FIG. 1 illustrates a display system according to an embodiment of the present disclosure.

FIG. 1 illustrates a display system 100 according to an embodiment of the present disclosure. The display system 100 may include a backlight 120 (e.g., having a rear mounted light source, side mounted light source, optionally with a light guide), and a plurality of different display screens 130-160. The display screens 130-160 may be disposed substantially parallel or parallel to each other in an overlapping manner In one example embodiment, the backlight 120 and the display screens 130-160 may be disposed in a common housing. The display apparatus 100 may be provided in a portable device such as a smartphone or tablet, an appliance, or for a vehicle dashboard application such as instrument or navigation application, but this invention is not so limited. In an example embodiment, the display apparatus 100 may be included in a dash display system of a vehicle to display a viewer images such as a speedometer, gauges such as oil pressure or fuel level gauges, navigation, etc. It should be appreciated that the elements illustrated in the figures are not drawn to scale, and thus, may comprise different shapes, sizes, etc. in other embodiments.

The display system 100 may display content to a viewer/observer 190 by displaying information on one, two, three, or more of the display screens 130-160 simultaneously. Each of the display screen 130-160 may be controlled to display different content in certain example embodiments. Displayed content on one of the display screens 130-160 may be moved (e.g., "pushed" or "pulled") to one or more of the other display screen(s) when a predetermined condition is satisfied. The predetermined condition may include a user input, exceeding a time limit after an event (e.g., when content is first displayed or after an input), detecting specific motion of the display (e.g., tilting), and/or detecting user motion. More detailed examples of moving content between display screens 130-160 when a predetermined condition is satisfied are provided below.

The first display screen 130 may be located closest to the user/viewer 190 and may be a touch sensitive display including a touch sensitive area 135 over a portion or all of the first display screen 130. The touch sensitive circuitry may be commonly housed with the first display screen 130 or may be provided separately from and in an overlapping manner with the first display screen 130. Touch inputs may be made to select, deselect, move, and/or manipulate content displayed on the first display screen 130 and/or on other displayed screen 140-160. The touch sensitive display may optionally be a pressure-sensitive display.

The touch sensitive display may include a proximity sensor that is configured to detect receive inputs by sensing the presence of nearby objects (e.g., a finger or a stylus) with or without any physical contact to the display and/or touch screen. In one embodiment, the proximity detection may be performed by one or more proximity sensors provided separately from the touch sensitive display.

Inputs for selecting, deselecting, moving, and/or manipulating content displayed on the first display screen 130 and/or on other displayed screen 140-160 may be received from other input devices such as a keyboard, touch panel, mouse, pen, and/or voice input device, but this invention is not so limited.

Each of the display panels/screens 130-160 may be a liquid crystal display (LCD) in certain example embodiments of this invention. Alternatively, the display screens 130-160 may include organic light emitting diode (OLED) displays, transparent light emitting diode (TOLED) displays, or the like. In one embodiment, the display panels 130-160 may be combinations of either full color RGB, RGBW or monochrome panels. The display screens 130-160 are not limited to the listed display technologies and may include other display technologies that allow for the projection of light. In one embodiment, the light may be provided by a projection type system including a light source and one or more lenses and/or a transmissive or reflective LCD matrix. The display screens 130-160 may include a multi-layer display unit including multiple stacked or overlapped display screens/panels each configured to render display elements thereon for viewing through the uppermost display layer. In other words, content displayed on the rearwardmost display panels/screens 140, 150, 160 passes through the frontmost display panel/screen 130 and can be seen by the viewer 190. For instance, content displayed by display screen/panel 160 passes through display panels 130-150 and can be seen by the viewer 190.

In one embodiment, each of the display screens 130-160 may be approximately the same size and each have a planar surface that is parallel or substantially parallel to one another. In another embodiment, one or more of the display screens 130-160 may have a curved surface. In one embodiment, one or more of the display screens 130-160 may be displaced from the other display screens such that a portion of the display screen is not overlapped and/or is not overlapping another display screen.

Each of the display screens 130-160 may be displaced an equal distance from each other in example embodiments. In another embodiment, the display screens 130-160 may be provided at different distances from each other. For example, a second display screen 140 may be displaced from the first display screen 130 a first distance, and a third display screen 150 may be displaced from the second display screen 140 a second distance that is greater than the first distance. The fourth display screen 160 may be displaced from the third display screen 150 a third distance that is equal to the first distance, equal to the second distance, or different from the first and second distances. In a vehicle display panel, the display screens 130-160 may be displaced 3 (or 4, or 5) mm to 15 mm from each other. In a mobile application, the display screens 130-160 may be displaced 0.5 mm to 5 mm from each other. In certain example embodiments, display screens/panels 130-160 are all provided. However, in other example embodiments it is possible for only two display screens 130 and 160 (or 130 and 140) to be provided, so that only two panels/screens are used.

The display screens 130-160 may be configured to display content for viewing by the observer 190. The viewer/observer 190 may be, for example, a user or an electrical and/or mechanical optical reception device (e.g., a still image, a moving-image camera, etc.). The content may include visual display of objects and/or texts. In one embodiment, the content may include text, buttons, images or a sequence of images to provide video or animations. In one embodiment, displaying the content may include moving objects and/or text across the screen or changing or providing animations to the objects and/or text. The animations may include changing the color, shape and/or size of the objects or text. Displayed objects and/or text may be moved between the display screens 130-160. A user may be able to adjust on which of the display screens 130-160 specific content is displayed.

Each of the display screens 130-160 may be configured to receive data and display, based on the data, a different image, text, buttons, maps, or other content on each of the display screens 130-160 simultaneously. Because the content display on each screen is separated by a physical separation due to the separation of the display screens 130-160, each content (e.g., image) is provided at a different focal plane and a different depth is perceived by the observer/viewer 190 so that a 3D appearance may be realized. The images may include graphics in different portions of the respective display screen.

Figure 2:
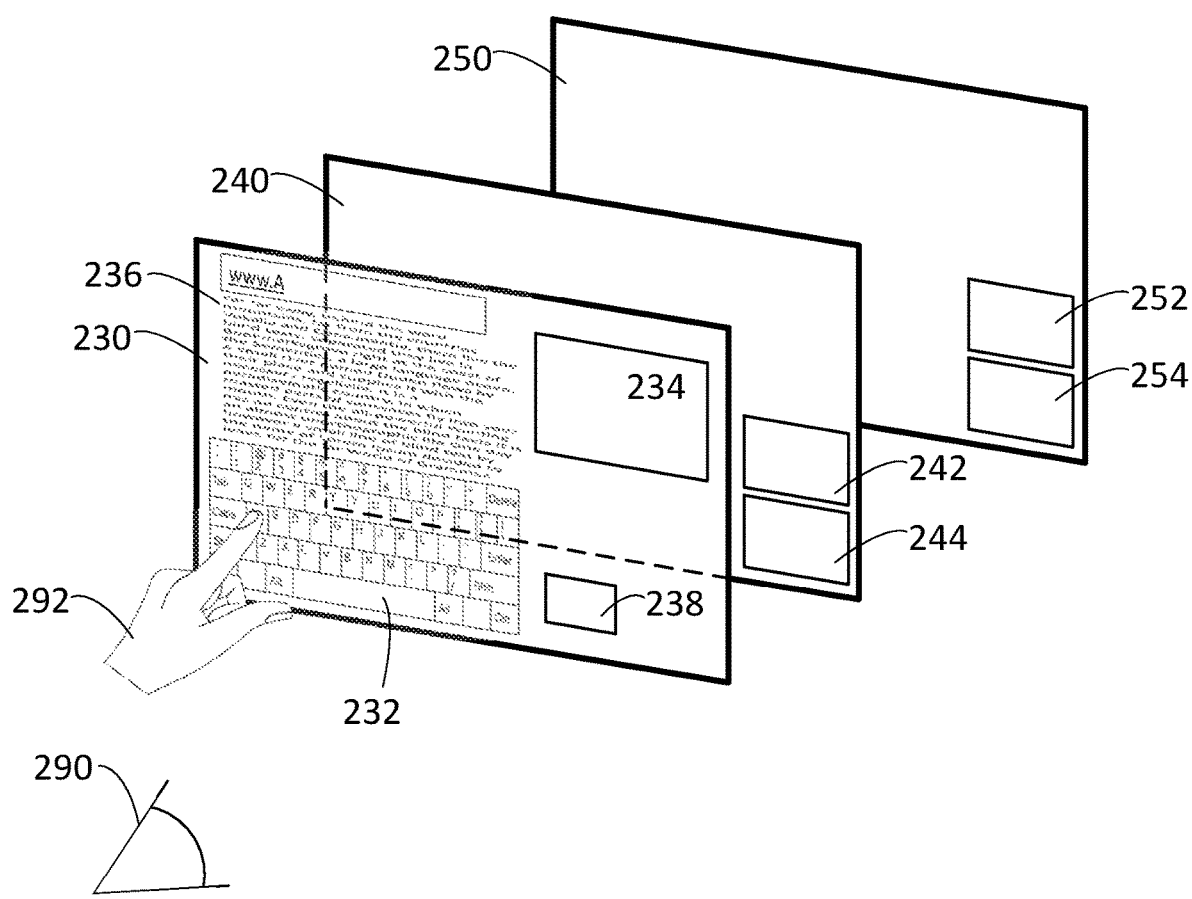
FIG. 2 illustrates a display system according to an embodiment of the present disclosure, which may use display panels/screens from FIG. 1.

FIG. 2 illustrates a display system 200. The display system 200 may include a plurality of display screens 230-250 for displaying content to an observer 290. The first display screen 230 may be a touch sensitive screen. The display system 200 may be coupled to a processing system configured to control the display of content on the display screens 230-250 based on received data representing inputs made to the touch sensitive screen. The FIG. 2 system may use the display screens/panels described above in connection with FIG. 1. In other words, display panels/screens 230, 240, and 250 may be display panels/screens 130, 140, and 150 from FIG. 1, respectively.

As illustrated in FIG. 2, the first display screen 230 may display content including a user entry interface, such as a keyboard 232 that includes a plurality of icons. The icons may include one or more symbols. A user may select one or more of the icons, and thus, one or more of the corresponding symbols, by making contact or touching the keyboard 232, for example, with one or more fingers 292. The contact may correspond to the one or more icons. In some embodiments, selection of one or more icons occurs when the user breaks contact with the one or more icons. In some embodiments, the contact may include a gesture, such as one or more taps, one or more swipes (e.g., from left to right, right to left, upward and/or downward) and/or a rolling of a finger (e.g., from right to left, left to right, upward and/or downward) that has made contact with the first display screen. In some embodiments, inadvertent contact with an icon may not select a corresponding symbol. For example, a swipe gesture that sweeps over an icon may not select a corresponding symbol if the gesture corresponding to selection is a tap gesture.

In some embodiments, an input to displayed content may be detected by proximity of the user's finger to the first display screen 230 (130) without the finger making contact with the first display screen 230. In another embodiment, a selection of displayed content may be made when pressure applied by the finger exceeds a predetermined amount.

The first display screen 230 may display one or more images 234 and text 236. The images 234 and/or text 236 may be received from memory associated with the processing system and/or from a remote location (e.g., internet). The text may display one or more of the characters and/or symbols that are selected by the user.

One or more buttons may be displayed on the display screens 230-250. As illustrated in FIG. 2, button 238 may be displayed in a portion of the first display screen 230 and buttons 242 and 244 may be displayed in a portion of the second display screen 240. Buttons 252 and 254 may be displayed in a portion of the third display screen 250. Buttons 252 and 254 may correspond to buttons 242 and 244, respectively, to display buttons 242 and 244 in a way to mimic depth cues of real buttons. The various keys of the keyboard shown in FIG. 2 are also buttons.

Figure 3:
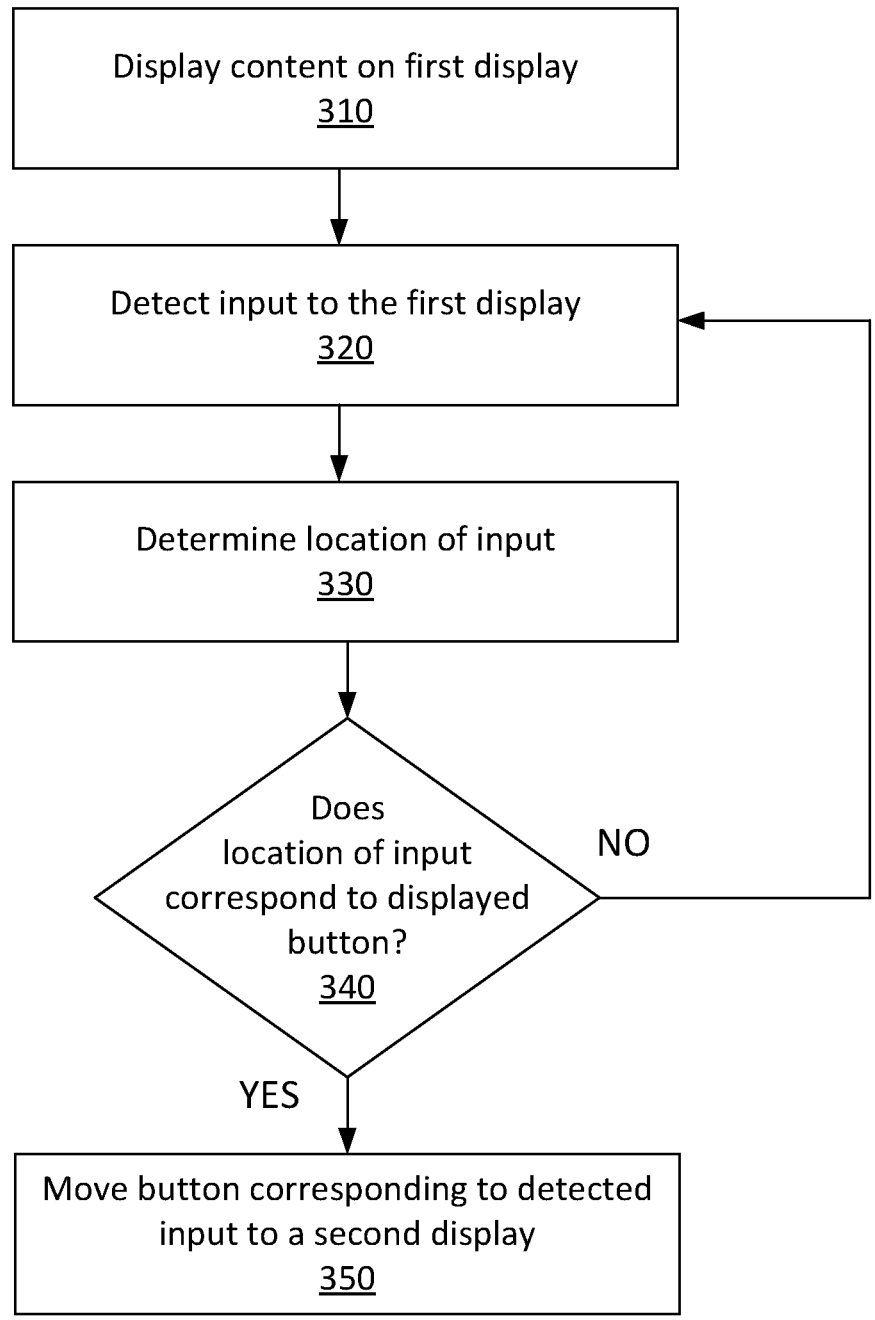
FIG. 3 illustrates a method for controlling the display of content according to an embodiment of the present disclosure.

FIG. 3 illustrates a method for controlling the display of content according to an embodiment of this disclosure. The content may be displayed on a multi-layer display system including a plurality of display screens provided in an overlapping manner (e.g., see FIGS. 1-2 and the descriptions thereof). The method may include displaying content on a first display screen 310. The content may include text, images and/or a plurality of buttons. While the content is displayed on the first display screen 310, an input may be detected 320 and the location of the input may be determined 330. When the location of the input on the first display screen (e.g., 130 or 230) corresponds to, and/or is proximate to, displayed content such as a button (YES in step 340), the button corresponding to and/or proximate to the detected input may be moved from the first display screen (e.g., 130 or 230) to a second display screen such as any of display panels/screens 140 (240), 150 (250), or 160 [see step 350], where the second display screen may be located rearwardly of the first display screen relative to the viewer/user.

Moving the button (or other content) to the second display may or may not include removing the display of the button (or other content) from the first display screen, and includes displaying the same button or a portion thereof on the second display screen, optionally in an enlarged manner. The content (e.g., button) may be displayed on the same scale or in an enlarged scale on the second screen/panel compared to how it was/is displayed on the first screen/panel. Alternatively, moving the button may include removing the display of the button on the first display screen and displaying a different button on the second display screen. The button on the second display screen may be displayed at a location that corresponds to the location of the button on the first display screen. The colors, shape, size, and/or texture of the button may be changed when it is moved from the first display screen to the second display screen. For example, the button may be enlarged when it is moved to the second display screen. In another embodiment, the button may be changed to appear brighter or to have a different color to simulate that the button is activated.

The first display screen displaying the content may overlap one or more other display screens of the multi-layer display system. The first display screen may be a touch sensitive display and/or may include a proximity detector. The input may be detected based on data received from the touch sensitive display and/or from the proximity detector. The input may be a touch input to the touch sensitive display. In another embodiment, the input may be hovering of an object (e.g., a finger or a stylus) near the surface of the first display screen. Detecting the input may include detecting whether the input is received for a predetermined period of time. Thus, if the input is stopped or substantially modified before the predetermined period of time passes after the input is received, the input may be disregarded.

Determining whether the input corresponds to one of the displayed buttons may include determining a location of the input (e.g., location of the touch input or location where an object is hovered) on the first display screen. If the determined location of the input corresponds to and/or is proximate to the location on the first display screen where a button (or other content) is displayed, the corresponding button (or other content) or a portion thereof may be displayed on the second display screen. For example, in response to the input, the display of the button (or other content) on the first display screen/panel 130, 230 may be removed and the button (or other content) may be displayed on the second display screen/panel such as any of 140 (250), 150 (250), and/or 160. If the second display screen is physically displaced so that it is behind the first display screen as viewed by an observer, moving the button from the first display screen to the second display screen may simulate pressing of the button and thus may be three dimensionally aesthetically pleasing to users/viewers. In other example embodiments, the button (or other content) may continue to be displayed on the front display screen/panel 130, 230 while also being pushed to a further rearward panel/screen where the button is displayed in a more enlarged manner on the further rearward second display screen/panel such as any of 140 (250), 150 (250), and/or 160 compared to how it is displayed on the front display panel/screen.

In one embodiment, the button may continue to be displayed on the second display screen after the input is terminated (e.g., touch input is stopped or moved away from the location of the button on the first display screen or the object is removed from the vicinity of the first display screen). If a second input is received while the button is displayed on the second display screen and the location of the input corresponds to the location where the button is displayed, the button may be moved back to the first display screen.

In one embodiment, the displayed button on the second display screen may be moved back to the first display screen when the input is terminated (e.g., when touch input is removed or when finger is moved out of the hover region). Thus, the button may be displayed on the second screen only while the input (e.g., touch input) is continued on the first display screen. In one embodiment, the input may be terminated when the touch input is moved away from a predetermined region around the button.

In one embodiment, one action with regard to the button may be performed when a hover input is detected and another action may be performed when a touch input is detected. For example, when a hover input is detected to a button the button may move to the second display panel but stay there only as long as the hover input is detected. When a touch input is detected, the button may be moved to the second display panel and continue to the displayed even after the touch input is removed. A second touch input may be applied to move the button back to the first display screen.

While the method illustrated in FIG. 3 is described with reference to a button, the method is not limited to displaying buttons. Other content such as images, video, and/or text may be displayed in accordance with this method. The buttons may correspond to buttons of a keyboard.

Figure 4A:
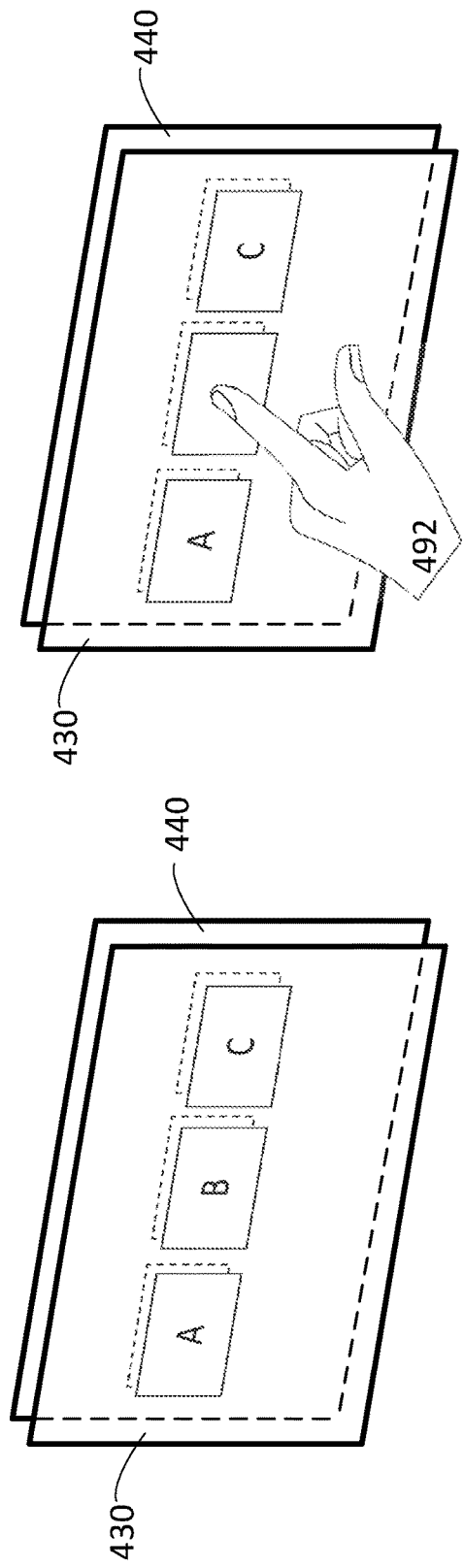
FIGS. 4A-4D illustrate the selection and moving the display of a button between a first display screen and a second display screen according to an embodiment of the present disclosure, where the display panels/screens of FIGS. 4A-4D may be those of FIGS. 1-2.
Figure 4B:
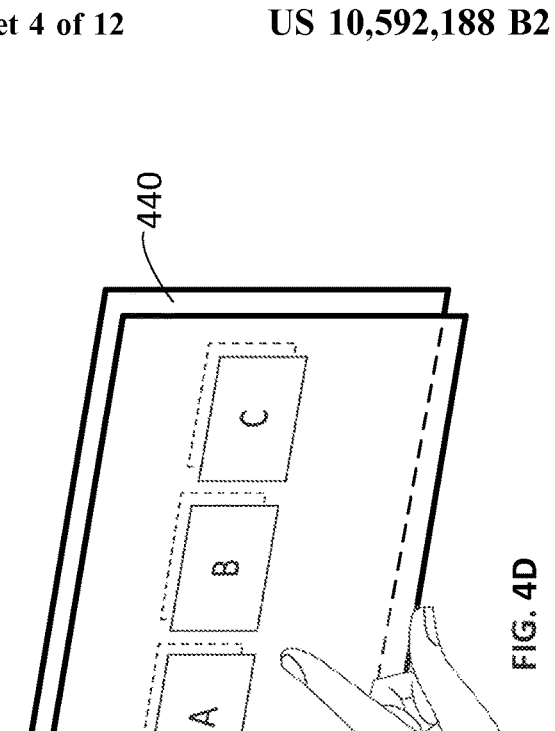
Figure 4C:
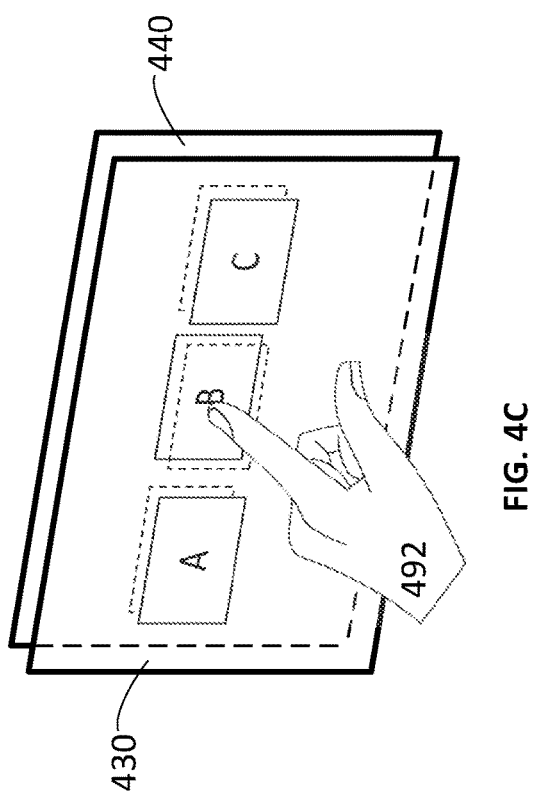
Figure 4D:
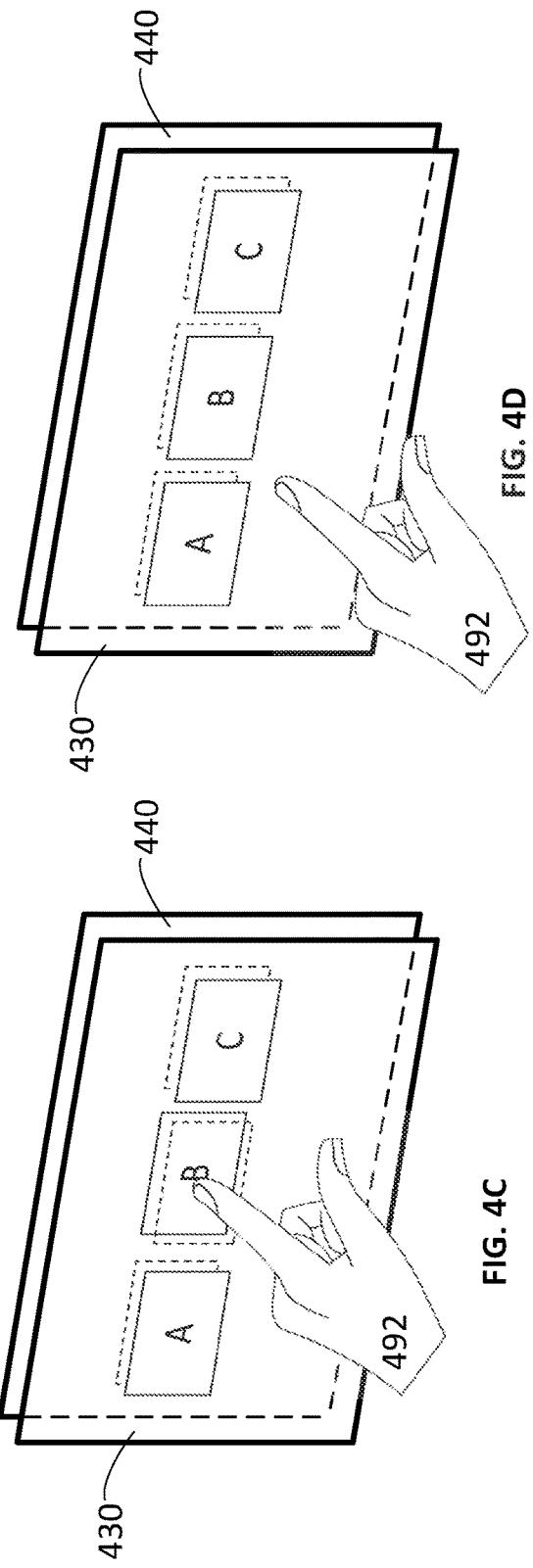

FIGS. 4A-4D illustrate the selection and moving the display of content such as a button between a first display screen/panel (130, 230, 430) and a second display screen (140, 240, 440) according to an embodiment of the present disclosure. While a button is the example content used in FIG. 4, other content (e.g., text, etc.) may be used instead of or in addition to the button. FIG. 4A illustrates a plurality of buttons A-C being displayed on a first display screen 130, 230, 430. The first display screen is displaced from and provided in front of a second display screen 140, 240, 440 as viewed by an observer. In response to an input by a user 492, a determination may be made as to whether the input corresponds to and/or is proximate a location of one of the displayed buttons (FIG. 4B). Because in FIG. 4B the input corresponds to and/or is proximate to button B, the display of button B may be moved from the first display screen to the second display screen (see FIG. 4C). In other words, the display of button B may be stopped on the front screen and the display of button B may be moved to and made on the second and more rearwardly located display screen 440. After the input is terminated the display of the button may be moved back from the second display screen 440 to the first display screen 430 (FIG. 4D).

As illustrated in FIGS. 4A-4D the problem of confirming the correct button press due to the obfuscation due the user's finger or hand may be avoided or reduced. In addition, tactical feedback on a single flat touch screen is solved by pushing display of a button to a second to display screen 440 that is below the first display screen 430. Controlling the display of content in this manner allows the user to see symbols and/or buttons (or other content) under the finger via virtue of parallax. Due to the depth of the secondary "back layer" displays, the slight parallax between the different displays allows the user to persistently and more easily have visibility of the pressed button, even while the finger or hand continues to obscure part or all of the objet initially displayed on the front display screen. The techniques of depth-bumping and specific examples of depth-pushing of displayed objects from a close display screen to a display that is at more of a distance from an observer/user, allows developers to build responsive touch inputs that bypass or reduce existing issues of visibility, and help to simulate the physical depression of buttons.

While only two display screens are illustrated in FIGS. 4A-4D, additional display screen may be provided in front of the first display screen 430, between the first display screen 430 and the second display screen 440, and/or behind the second display screen 440. The multiple layers of the multi-layer display may allow to alter the displayed depth of objects (e.g., buttons) by moving the button from one or more of the front displays to one or more back displays. For example, two or more of the front display screens may display a button before an input is received and two or more back display screen may be used to display the button after the input to the button is confirmed. When the button is moved to the back layers, the color, shape and dimensions of the button may be changed to simulate the pressing of the button or better visibility.

Figure 5:
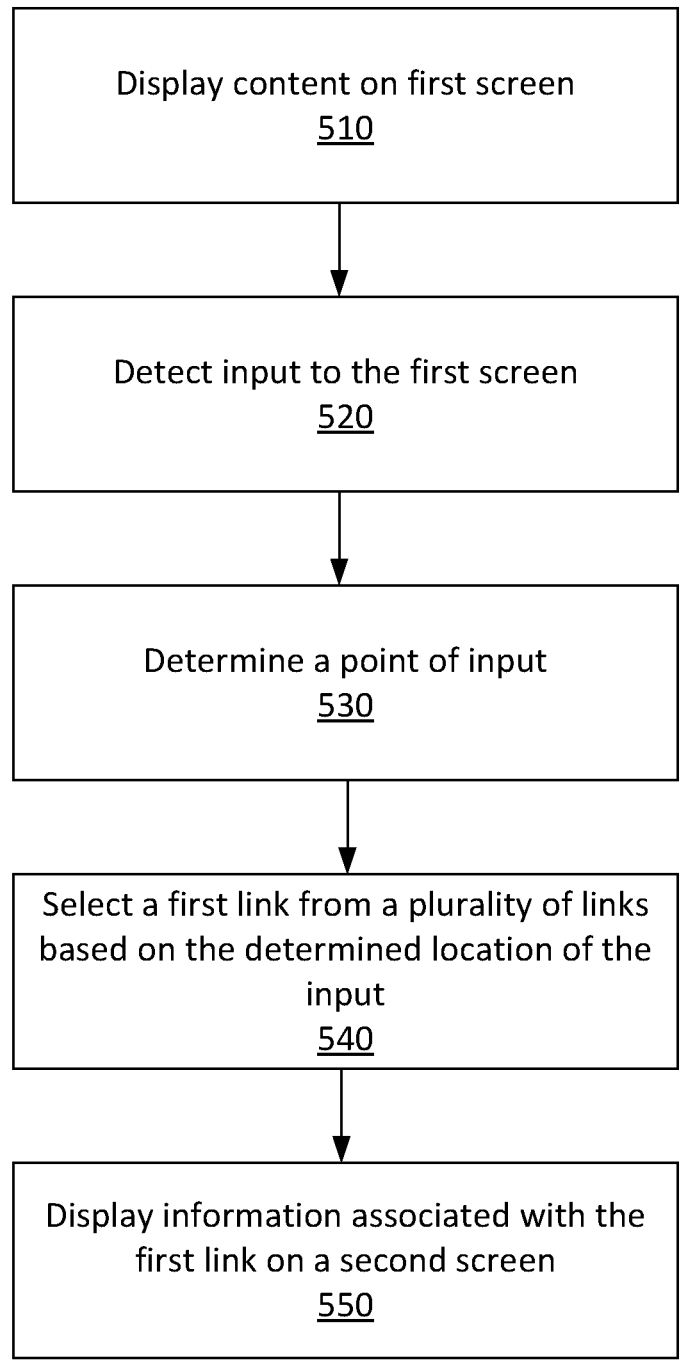
FIG. 5 illustrates a method for controlling the display of content according to an embodiment of the present disclosure.

FIG. 5 illustrates a method for controlling the display of content according to an example embodiment of this disclosure. The method may be performed by a processing system including at least one processor (e.g., including processing circuitry) and/or memory. The content displayed may include content associated with a link, but is not so limited. The content may be displayed on a first display screen of a multi-layer display system including a plurality of display screens 510. The first screen may overlap one or more other display screens of the multi-layer display system. The content may include a plurality of links, which may be clustered together or scattered throughout the content. In some embodiments, the content is a webpage, which may be rendered in a web browser application. In some other embodiments, the content may be an email, text message, or some other document, rendered in an application, that includes one or more links.

An input to the multi-layer display system may be detected 520. The input may be a touch input or proximity input detected by a proximity sensor. The input may be made by a finger, but is not so limited. The touch input may be detected when contact is made with a touch screen of a touch sensitive display. The contact may be detected by a contact/motion module, in conjunction with a touch-sensitive display system and a touch screen controller. The contact may form a contact area on the touch screen. The touch input may be detected when pressure exceeding a predetermined amount is made with a touch screen.

A point within or proximate the contact area made by the input may be determined 530. In some embodiments, the point is determined by a contact point module in conjunction with a touch-sensitive display system, the touch screen controller, and/or the processor(s). The determined point may serve as a reference point for the contact and/or input area. In some embodiments, the determined point is the centroid of the contact area. In some other embodiments, the determined point is a point determined in accordance with a predefined procedure. For example, in a one embodiment, the determined point is determined by determining the center of an imaginary rectangular box that bounds the contact area. However, in some embodiments, the determined point is a point other than the box center or centroid, and is determined in accordance with one or more factors, such as the shape of the contact area (which may be indicative of which finger of the user is making contact with the touch screen), and the location of the contact (e.g., which region of the touch screen). One or more of these factors may be used to determine an "intended point of contact" that is displaced from the box center or centroid.

A link from the plurality of links being displayed on the first panel/screen 130/230/430/730 may be chosen based on the determined location of the input 540. The link may be determined by a closest link module in conjunction with the processor(s). The link may be chosen based on at least the proximity to the determined point in the contact area. The link that is chosen is the one that is the closest to the determined point. In some embodiments, the links from which a link is chosen is limited to those whose display area (e.g., anchor text, anchor image) overlap completely or partially with the contact area. In some embodiments, a plurality of links of may be chosen.

Information associated with the chosen link(s) may be displayed on a second display screen in step 550 of the multi-layer display system that is different from the first display screen. The second display screen may be a screen that is overlapped by the first display screen as viewed by an observer. The second display screen may be adjacent to the first display screen or one or more other display screens may be included between the first and second display screens.

The displayed information associated with the chosen link may include information other than the anchor text of the link. For example, the displayed information may include the URL of the webpage or document to which the link links, the title of the webpage or document to which the link links. The displayed information may include a snippet of the content in the webpage or document to which the link links, and/or a summary of the content of the webpage or document to which the link links. In some embodiments, the displayed information associated with the chosen link does not include the anchor text of the link. In other embodiments, the displayed information associated with the chosen link may include the anchor text of the link. The links may be linked to files stored in memory and in response to a selection of the link, another directory or a file associated with the link (e.g., video, picture, or song) may be retrieved. The content displayed on the first display screen may be displayed over the information associated with the chosen link on the second display screen. The content displayed on the first display screen may be displayed with an opaque or semi-transparent overlay.

Figure 6:
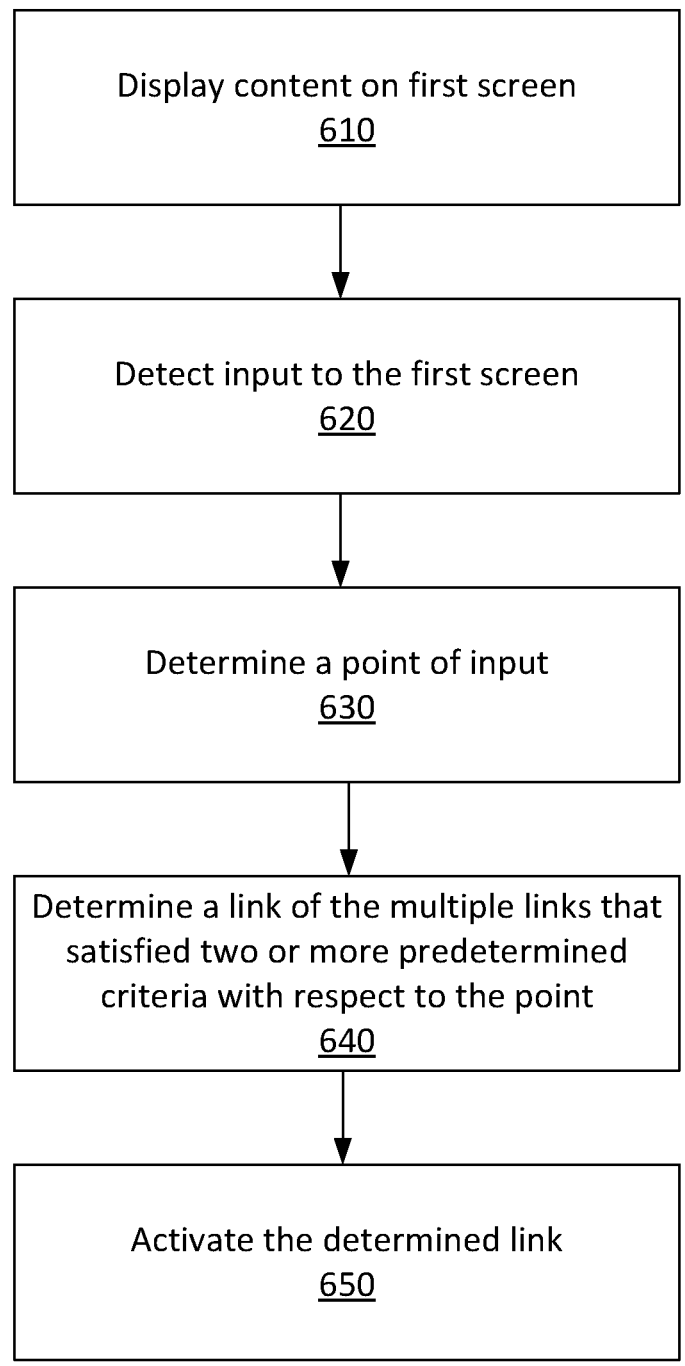
FIG. 6 illustrates a method for controlling the display of content according to an embodiment of the present disclosure.

FIG. 6 illustrates a method for controlling the display of content according to an embodiment of this disclosure. The method may be performed by a processing system. The content displayed may include content associated with a link. The content may be displayed on a first display screen of a multi-layer display system including a plurality of display screens. The first screen may overlap one or more other display screens of the multi-layer display system. The content may include a plurality of links, which may be clustered together or scattered throughout the content. In some embodiments, the content is a webpage, which may be rendered in a web browser application. In some other embodiments, the content may be an email, text message, or some other document, rendered in an application, that includes one or more links.

An input to the multi-layer display system may be detected 620. The input may be a touch input or proximity input detected by a proximity sensor. The input may be made by a finger, but is not so limited. The touch input may be detected when contact is made with a touch screen of a touch sensitive display. The contact may be detected by a contact/motion module, in conjunction with a touch-sensitive display system and a touch screen controller. The contact may form a contact area on the touch screen.

A point within the contact area made by the input may be determined 630. In some embodiments, the point is determined by a contact point module in conjunction with a touch-sensitive display system, the touch screen controller, and/or the processor(s) (e.g., including processing circuitry). The determined point may serve as a reference point for the contact area. In some embodiments, the determined point is the centroid of the contact area. In some other embodiments, the determined point is a point determined in accordance with a predefined procedure. For example, in a one embodiment, the determined point is determined by determining the center of an imaginary rectangular box that bounds the contact area. However, in some embodiments, the determined point is a point other than the box center or centroid, and is determined in accordance with one or more factors, such as the shape of the contact area (which may be indicative of which finger of the user is making contact with the touch screen), and the location of the contact (e.g., which region of the touch screen). One or more of these factors may be used by a contact point module to determine an "intended point of contact" that is displaced from the box center or centroid.

A link from the plurality of links that satisfies two or more predetermined criteria with respect to the determined point may be determined 640. The determination may be made by a closest link module in conjunction with the processor(s). The two or more criteria may include a closest proximity criterion and a maximum proximity criterion. That is, a link that is within a specified maximum distance from the point and is the closest to the point is determined. In one embodiment, the determined link must also overlap at least partially with the contact area.

The determined link may be activated 650. That is, the device may navigates to a page to which the determined link points and the contents of the linked page may be displayed on the device. Activating the link may include providing a preview of the content associated with the link. For example, a preview of the webpage, document, image, song, or video.

FIGS. 7A-7I illustrate a user interface for displaying information associated with links and activating links in accordance with some embodiments of this disclosure. While the figures illustrate links, it is to be understood that other objects such as icons, images, and/or buttons may be provided in place of the illustrated links. The links or objects may be linked to webpages, documents, images, videos and/or songs, but is not so limited.

A device such as a portable electronic device with a multi-layer display may display a webpage 732 or other content (e.g., a document or file directory) on one of the display screens of the multi-layer display system. The multi-layer display system may include a touch screen. The first display screen 730 may include the touch screen. The first display screen 730 may overlap a second display screen 740. The displayed content may include a plurality of links. The links may be clustered together within or distributed throughout a webpage or document.

Figure 7A:
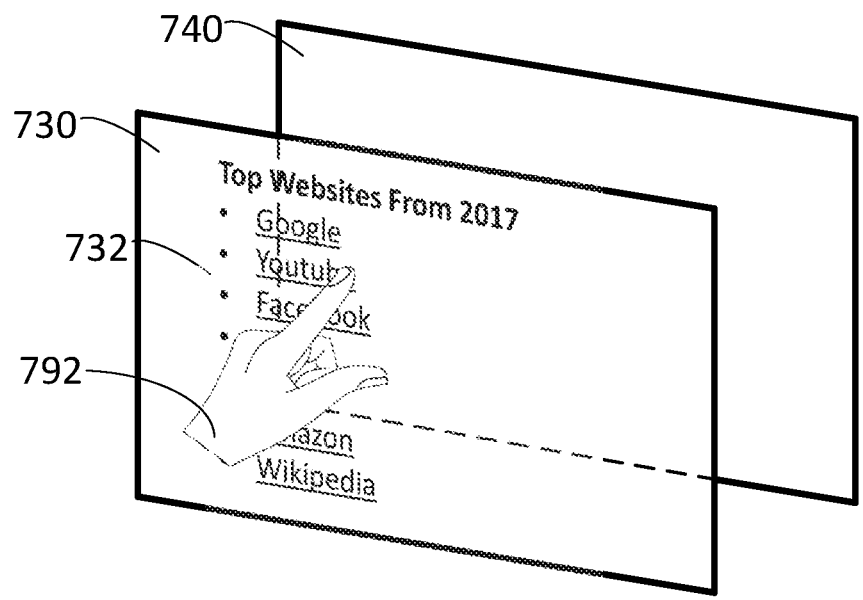
FIGS. 7A-7I illustrate a user interface for displaying information associated with links and activating links in accordance with certain example embodiments of this disclosure, where the display panels/screens of FIGS. 7A-7I may be those of FIGS. 1-2 and 4.
Figure 7B:
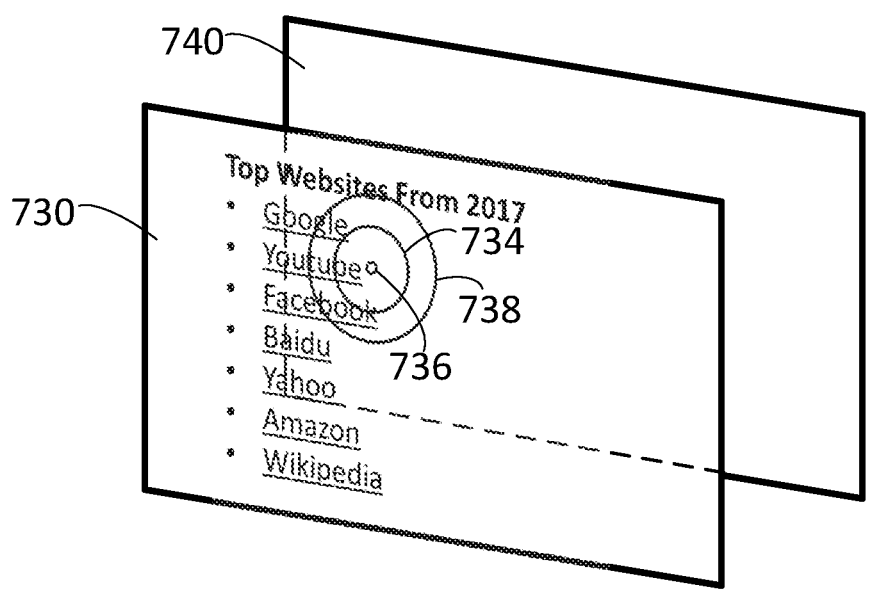

As illustrated in FIGS. 7A and 7B, when the user 792 makes contact with the touch screen 730, a contact area 734 on the touch screen 730 is made. A point 736 within the contact area 734 is determined (e.g., by a contact point module in conjunction with the touch-sensitive display system, the touch screen controller, and/or the processor(s)) (e.g., including processing circuitry). In some embodiments, the point 736 is the centroid of the contact area 734. However, the contact area 736 does not necessarily remain constant throughout the duration of the contact. The contact area 734 may change shape and thus the centroid or other determined point of the contact area may shift. To account for this, in some embodiments, the centroid may be re-determined at predefined intervals. More generally, the point 736 may be re-determined to account for changes in the contact area 734 and/or repositioning of the contact area 734 (for example, by movement of the finger).

When the user 792 makes contact with the touch screen 730, a determination may be made for a link amongst the plurality of links that satisfies a number of predefined criteria with respect to the contact area 734 and/or the point 736. In some embodiments, the determination is made by the closest link module in conjunction with the processor(s). The link that is determined satisfies at least a closest link criterion (e.g., the determined link is the closest one to the point 736). In some embodiments, the link that is determined also satisfies one or more of the following criteria: being within a maximum distance 738 from the point 736, partially overlapping the contact area 734, located completely within the contact area 734 or maximum distance 738, and/or located completely within the contact area 734 or maximum distance 738 for a predetermined period of time. In one embodiment, for purposes of activation of a link, the link that is determined for activation satisfies at least both the closest link criterion and the maximum distance criterion. It should be appreciated, however, that additional criteria may be used, such as pressure of the touch input.

Figure 7C:
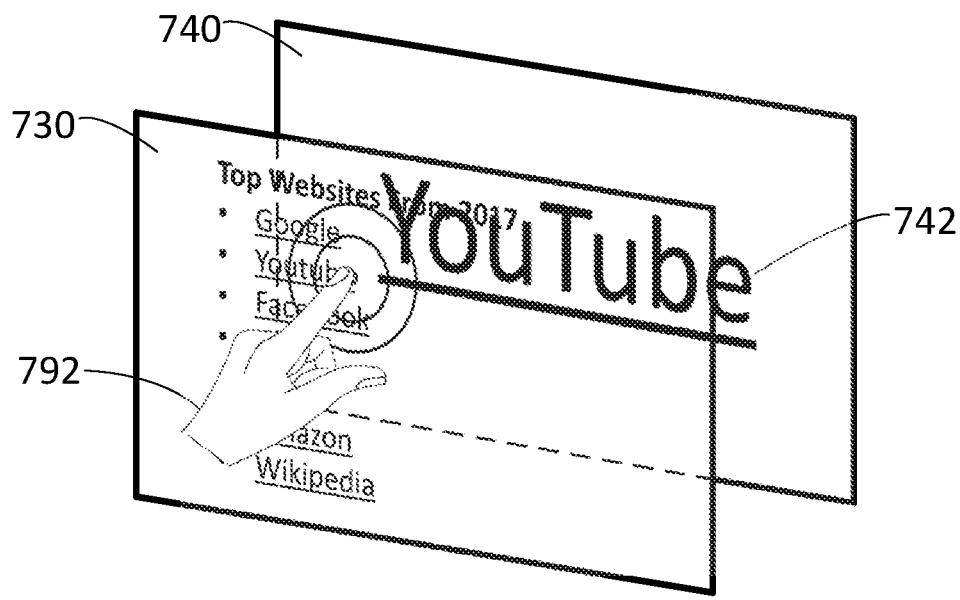

As illustrated in FIG. 7C, in response to the input, information associated with the link that is closest to the point 736 may be displayed on the touch screen 730. In some embodiments, the link for which associated information is displayed must also be within a maximum distance 738 from the point 736. In FIG. 7C, the closest link to the point 736 is the link having the anchor text "Youtube." Information 742 associated with the link "Youtube" is displayed on a second display screen 740 that is overlapped by the first display screen 730 as viewed by the observer. The information 742 illustrated in FIG. 7C includes text that is the same as the anchor text shown on the first display screen 730. The information 742 is enlarged on the second display screen 740 to allow the user to see what is being selected. The information 742 may be displayed with a different color from the corresponding text displayed in the first display screen 730.

Figure 7D:
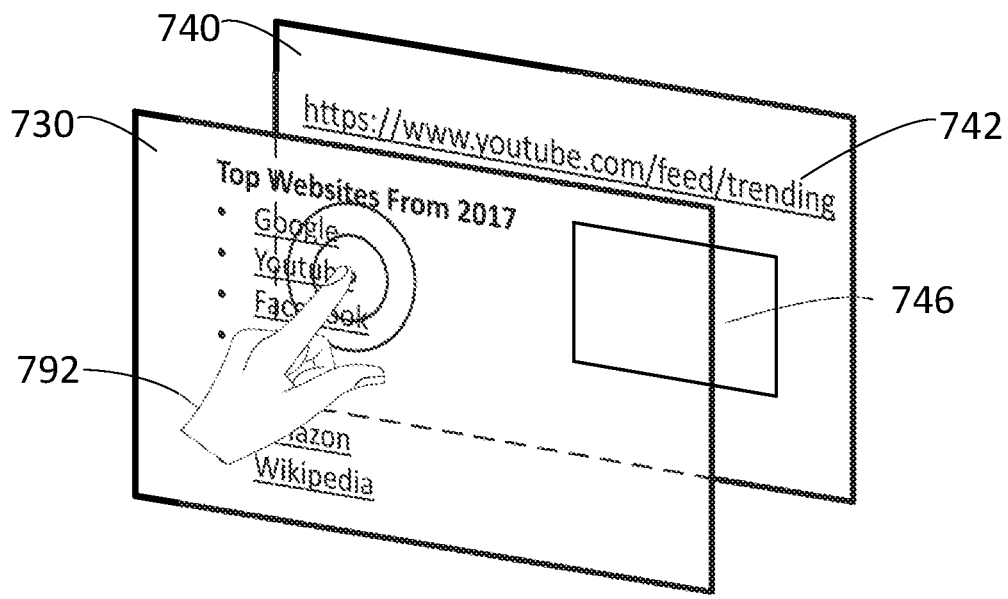
Figure 7E:
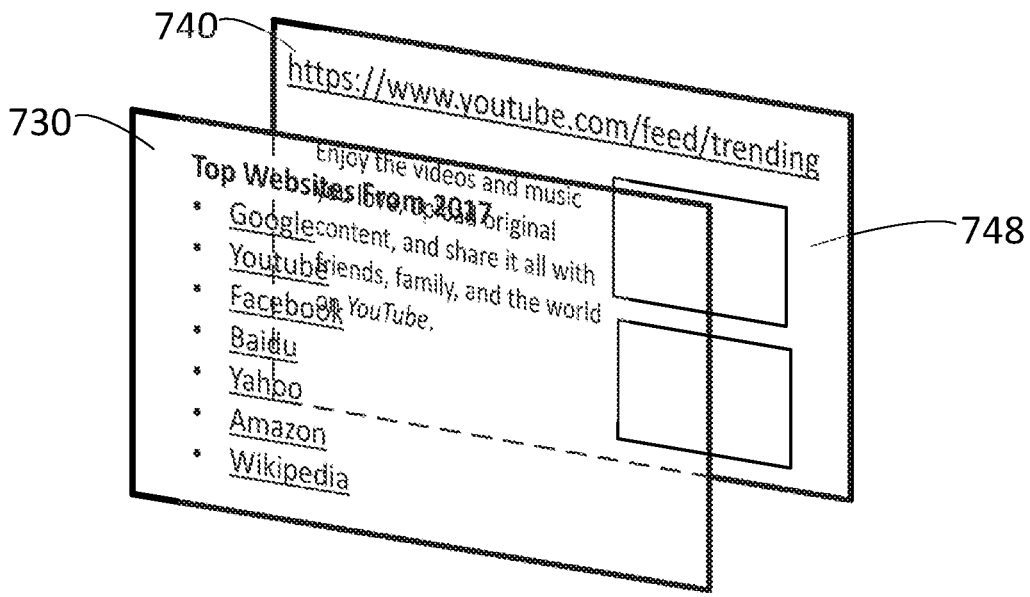

In some embodiments, the displayed information 742 may include the Uniform Resource Locator (URL) of the link, a snippet of content from the page to which the link points, and/or a summary of the content from the page to which the link points (an example of which is shown in FIG. 7D). The anchor text of the link may be included or omitted in the displayed information 742. As illustrated in FIG. 7D, the information 742 may include an image and/or a video 746 associated with the selected anchor text.

In some embodiments, the information 742 is displayed on the second display screen 740 after the contact is maintained for at least a predetermined time (e.g., 0.2 seconds, or another value between 0.1 and 0.25 seconds) for displaying the link information. In some embodiments, the information is removed from display in the second display screen 740 if the contact area 734 is not moved for longer than a predefined amount of time. For example, the information 742 displayed on the second display screen 740 may be removed after a predetermined amount of time (e.g., three to five seconds) if the contact area 734 is maintained in the position.

Figure 7F:
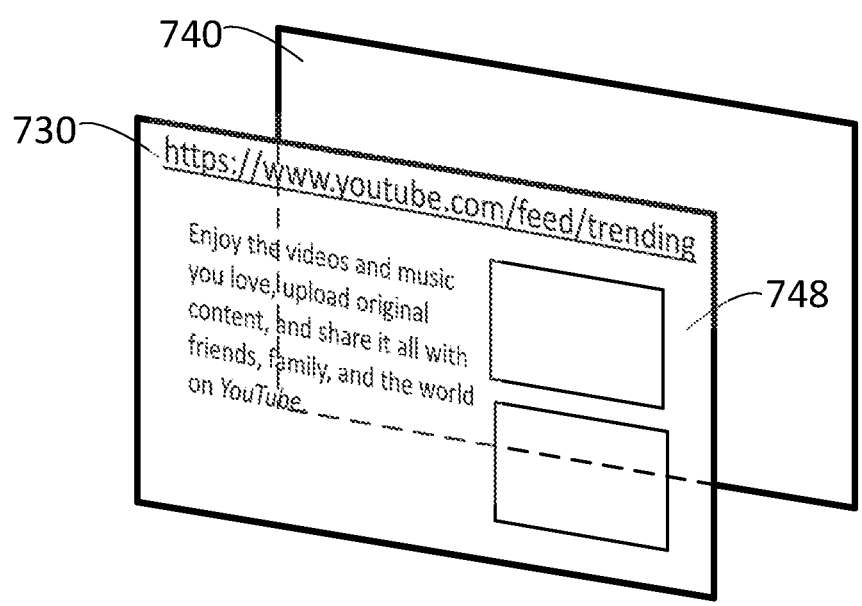

If the determined link is within the maximum distance 738 from the point 736, in addition to having the shortest distance from the point 736, the link may be activated. That is, the device may navigate to the page 748 to which the determined link points (e.g., FIG. 7E). In some embodiments, the display area of the determined link must also at least partially overlap with the contact area 734 in order to be activated. The page 748 associated with the selected anchor text may be displayed on the second display screen 740 with or without the content being displayed on the first display screen. The content on the first display screen may be removed when the page 748 is displayed. In one embodiment, the page 748 may be displayed on the first display screen 730 in response to the selection (FIG. 7F).

The activation of the link may be triggered in a variety of ways. In some embodiments, the activation is triggered by breaking the contact. For particular embodiments, the activation may be triggered after the breaking of contact before or after a first predetermined amount of time has elapsed. In some other embodiments, the activation of the link may be triggered by a gesture, such as a quick tap on the touch screen after breaking contact. Furthermore, in some embodiments, if the contact is held for longer than a second predetermined amount of time, whatever link information that is displayed is removed from display and the link is not activated. In some other embodiments, the activation of the link may be triggered when additional pressure is applied while the information associated with the link is displayed on the second display 740. In some embodiments, a combination of such activation criteria are used: the selected link is activated by a contact break if the link information was displayed less than the first predetermined amount of time, and if the link information was displayed for more than that amount of time, then the user must break contact and tap the link information (which is continued to be displayed after the contact break) to activate the selected link.

The user may move the finger along the touch screen while still maintaining contact. This may be called "brushing" or "scrubbing" the displayed document, or "brushing" or "scrubbing" the screen. As the finger moves, so do the contact area 734 and the point 736. Thus, the link that satisfies the one or more criteria with respect to the point 736 and the contact area 734 may change. As the link that satisfies the criteria changes, the information 742 associated with the link that is displayed on the second display screen 740 may change.

Figure 7G:
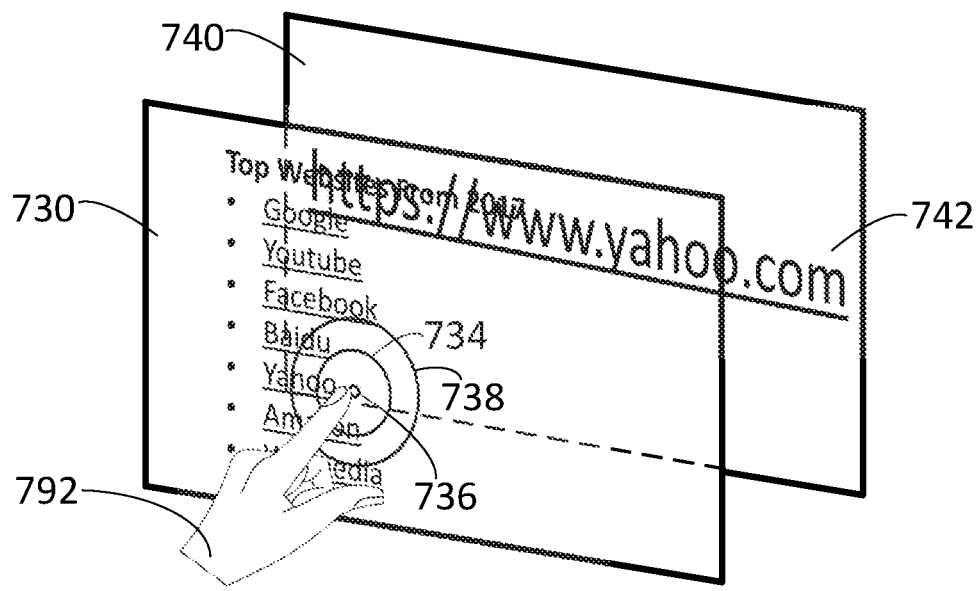
Figure 7H:
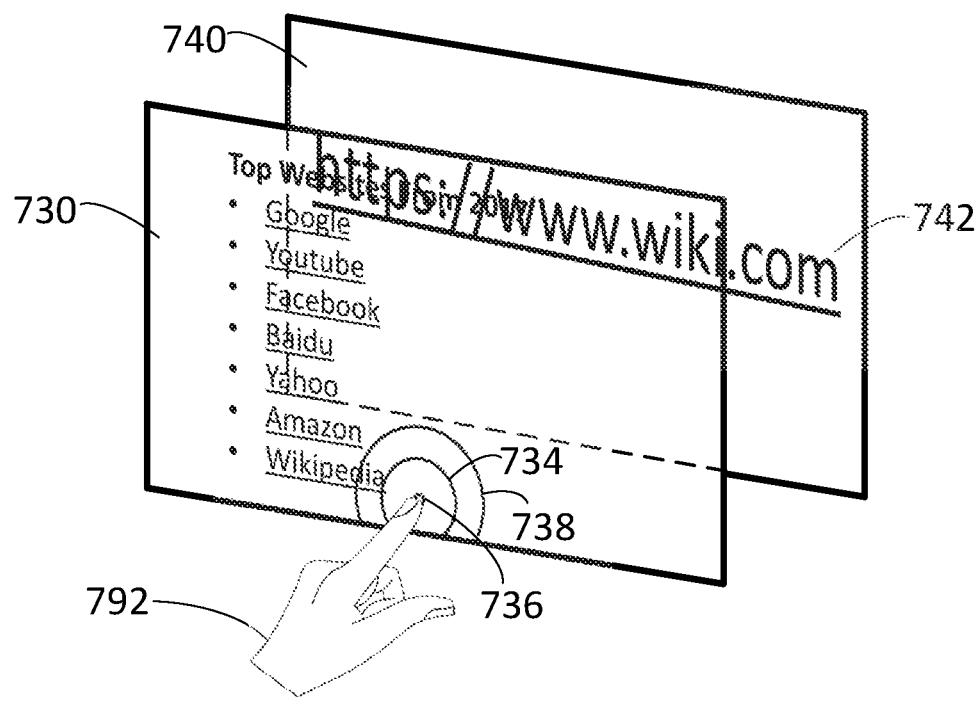

FIG. 7G illustrates the contact area 734 and the point 736 being moved downward on the first display screen 730. The link "Yahoo" becomes the link that satisfies the shortest distance criterion. Thus, the information associated with the link "Youtube" is no longer displayed on the second display screen 740 and information 742 associated with the link "Yahoo," such as its URL, is displayed on the second display screen 740. As the contact area 734 moves even further down and/or to one of the sides (e.g., see FIG. 7H), other links, such as the link "Wikipedia," becomes the link that satisfies the closest point criterion with respect to the point 736. The information associated with the previous determined link is no longer displayed on the second display screen 740 and information associated with the link "Wikipedia" is displayed on the second display screen 740. Similarly, if the user moves the finger upward, other links may satisfy the criterion or criteria and information associated with these links may be displayed. More generally, as the contact area 734 is moved, links that satisfy the criteria may be determined and information associated with these links may be displayed one at a time and in succession on the second display screen 740.

Information associated with links may be displayed whether the document is at normal size, zoomed in, or zoomed out. Even if the document is zoomed out such that the effective font size of the text in the document is relatively small on the first display screen 730, the information 742 associated with a respective link is displayed at a legible size on the second display screen 740. Furthermore, the font size used for displaying the link information 742 may be independent of the font size, zoom factor or scale factor of the document or other content displayed on the first display screen 730.

In some embodiments, the information associated with the selected link 742 is displayed on a portion of the second display screen 740 that is away from the location of the contact area 734. For example, if the contact area 734 is in the bottom portion of the first display screen 730 (see FIG. 7H), the associated information 742 may be displayed in a top portion of the second display screen 740 (see FIG. 7H). More generally, the associated information 742 may be displayed away from the contact area 734 so that the user's finger does not obstruct the user's view of the associated information 742.

Figure 7I:
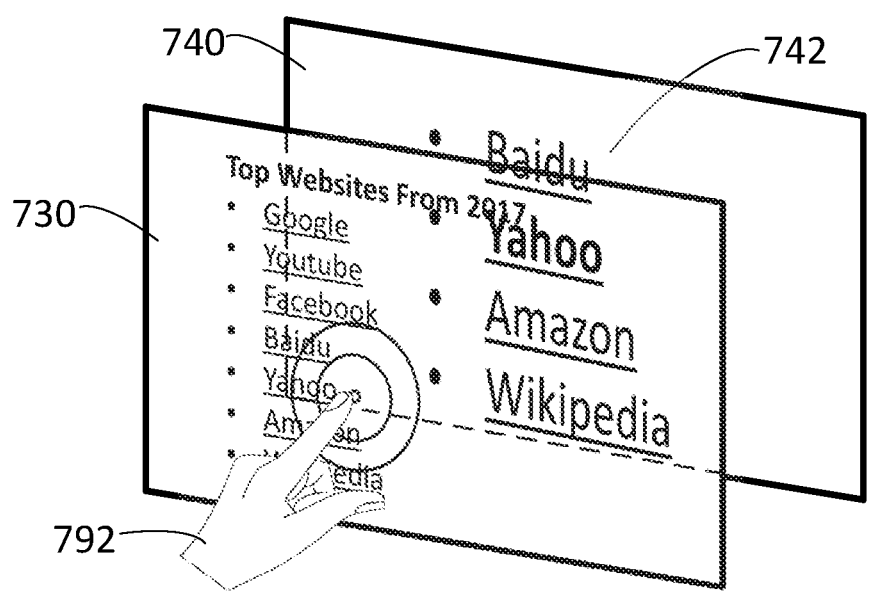

In some embodiments, a zoom or scale factor may be associated with the content that is displayed on the second display screen 740, or with pressure applied by a finger or stylus. For example, the device may display a document at 100% zoom ("normal" size) and then zoom in (e.g., 150%, 200%, etc.) or out (e.g., 75%, 50%, etc.). As illustrated in FIG. 7I, content in the vicinity of the contact area 734 on the first display screen 730, is enlarged and displayed on the second display screen 740. A link corresponding to the closest link on the first display screen 730 may be highlighted (e.g., shown in bold), as illustrate in FIG. 7I.

In some embodiments, the maximum distance 738 may be adjusted in proportion with the zoom factor. For example, if the maximum distance at 100% zoom is X, then the maximum distance at 50% zoom is X*0.5. More generally, in some embodiments, the maximum distance may be defined in terms of the coordinates of the content or document. This means that the maximum distance changes in terms of absolute distance but remains constant in terms of relative distance amongst the content in the document or webpage. The zoomed-out document or webpage on the first display screen may results in a smaller maximum distance 738. As the document or webpage is zoomed out even further, the maximum distance 738 may be located entirely within the contact area 734, making the maximum distance 738 moot. In this case, the boundary of the contact area 734 may be used as a proxy for the maximum distance. In some other embodiments, the maximum distance may be defined in terms of the coordinates of the touch screen; the maximum distance is a constant in terms of absolute distance.

In some embodiments, a link may be chosen based on other geometric features or shapes that are determined based on the contact area 734 and/or point 736. For example, a boundaries of a rectangle, square, oval, or triangle that are determined based on the contact area 734 and/or point 736 may be used to choose the link from the plurality of links. In one example, a spiral generating out from the contact area 734 and/or point 736 may be used to select the link. The link whose display area first intersects the spiral may be the link that is chosen and for which associated information is displayed on the second display screen 740. In some embodiments, the spiral path is implemented as an actual spiral, while in other embodiments the spiral path may be implemented as a sequence of concentric circles of increasing radius. When implemented as an actual spiral, the spiral path may be clockwise or counter-clockwise. The size and rate of the spiral may be defined in terms of the coordinates of the content and may scale in accordance with the zoom factor of the document, similar to the maximum distance 738 described above. In some embodiments, if the radius of the spiral reaches a predetermined radius (which may also be scaled in accordance with the zoom factor of the content), such as the maximum distance 738, and no link intersects the spiral, no link is chosen for the displaying of information or for activation. The spiraling path may be treated as proxies for the closest distance criterion and the maximum distance criterion: the link that intersects the spiral first is considered to be the closest to the point 736 and the predetermined radius serves as the maximum distance.

Using the interface described above, a user may more easily view information associated with links and activate links using a finger contact on a touch screen to select a hyperlink. The user is relieved of having to worry about the precision of his finger contact with respect to selection of links. Furthermore, the user can view link information and activate links even if the links are displayed at such a small size that the links are illegible or barely legible. In addition, the user is able to see hyperlink information on a second display even when a user's finger or hand obstructs the view the same or different information on the first display screen.

Figure 8:
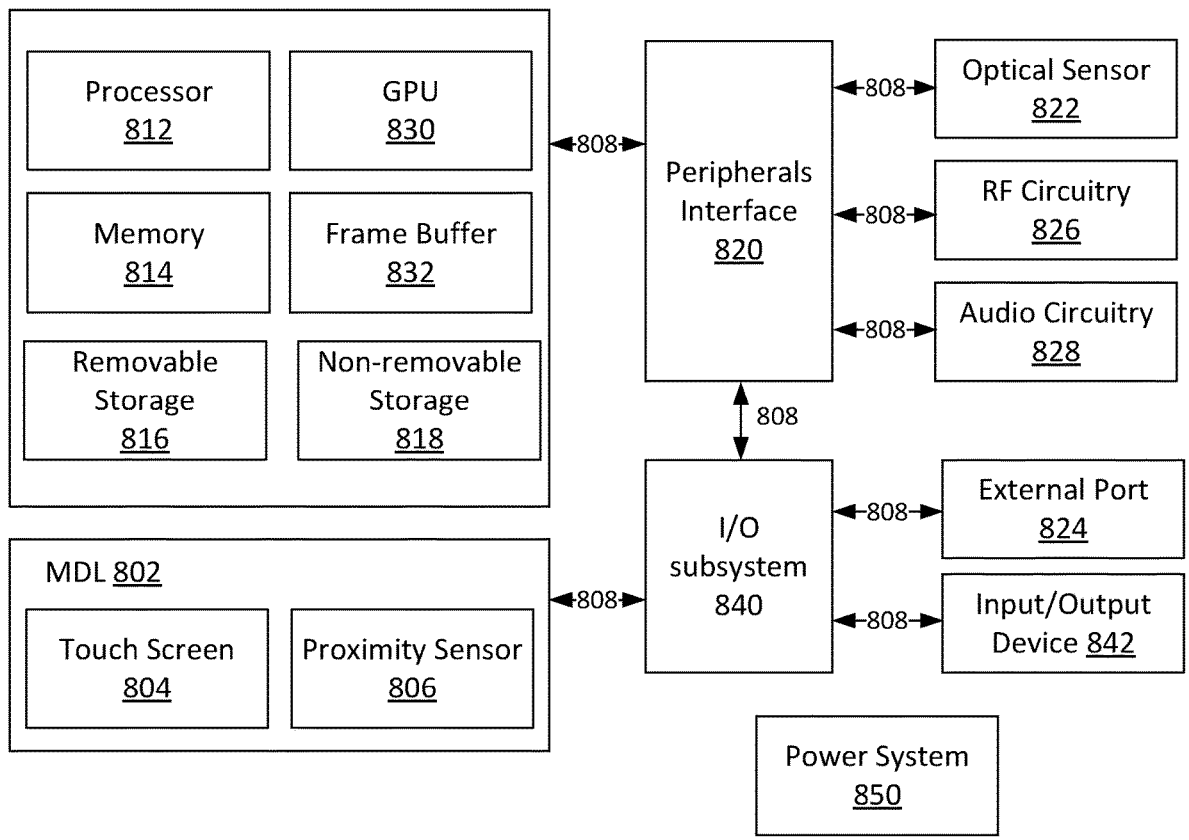
FIG. 8 illustrates an exemplary processing system upon which any of the various embodiments of the present disclosure(s) may be implemented.

FIG. 8 illustrates an exemplary system 800 upon which embodiments of the present disclosure(s) may be implemented. The system 800 may be a portable electronic device that is commonly housed, but is not so limited. The system 800 may include a multi-layer display 802 including a plurality of overlapping displays. The multi-layer system may include a touch screen 804 and/or a proximity detector 806. The various components in the system 800 may be coupled to each other and/or to a processing system by one or more communication buses or signal lines 808.

The multi-layer display 802 may be coupled to a processing system including one or more processors 812 and memory 814. The processor 812 may comprise a central processing unit (CPU) or other type of processor. Depending on the configuration and/or type of computer system environment, the memory 814 may comprise volatile memory (e.g., RAM), non-volatile memory (e.g., ROM, flash memory, etc.), or some combination of the two. Additionally, memory 814 may be removable, non-removable, etc.

In other embodiments, the processing system may comprise additional storage (e.g., removable storage 816, non-removable storage 818, etc.). Removable storage 816 and/or non-removable storage 818 may comprise volatile memory, non-volatile memory, or any combination thereof. Additionally, removable storage 816 and/or non-removable storage 818 may comprise CD-ROM, digital versatile disks (DVD) or other optical storage, magnetic cassettes, magnetic tape, magnetic disk storage or other magnetic storage devices, or any other medium which can be used to store information for access by processing system.

As illustrated in FIG. 8, the processing system may communicate with other systems, components, or devices via peripherals interface 820. Peripherals interface 820 may communicate with an optical sensor 822, external port 824, RC circuitry 826, audio circuitry 828 and/or other devices. The optical sensor 882 may be a CMOs or CCD image sensor. The RC circuitry 826 may be coupled to an antenna and allow communication with other devices, computers and/or servers using wireless and/or wired networks. The system 800 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), BLUETOOTH (BLUETOOTH is a registered trademark of Bluetooth Sig, Inc.), Wi-MAX, a protocol for email, instant messaging, and/or a short message service (SMS), or any other suitable communication protocol, including communication protocols not yet developed as of the filing date of this document. In an exemplary embodiment, the system 800 may be, at least in part, a mobile phone (e.g., a cellular telephone) or a tablet.

A graphics processor 830 may perform graphics/image processing operations on data stored in a frame buffer 832 or another memory of the processing system. Data stored in frame buffer 832 may be accessed, processed, and/or modified by components (e.g., graphics processor 830, processor 712, etc.) of the processing system and/or components of other systems/devices. Additionally, the data may be accessed (e.g., by graphics processor 830) and displayed on an output device coupled to the processing system. Accordingly, memory 814, removable 816, non-removable storage 818, frame buffer 832, or a combination thereof, may comprise instructions that when executed on a processor (e.g., 812, 830, etc.) implement a method of processing data (e.g., stored in frame buffer 832) for improved display quality on a display.

The memory 814 may include one or more applications. Examples of applications that may be stored in memory 814 include telephone applications, email applications, text messaging or instant messaging applications, memo pad applications, address books or contact lists, calendars, picture taking and management applications, and music playing and management applications. The applications may include a web browser for rendering pages written in the Hypertext Markup Language (HTML), Wireless Markup Language (WML), or other languages suitable for composing webpages or other online content. The applications may include a program for browsing files stored in memory.

The applications, including the web browser, may render content that includes one or more hyperlinks (or "links") that link to other content. A hyperlink to an item of content is associated with the Universal Resource Locator (URL) of the item of content. Hyperlinks may be included in a wide variety of documents, including but not limited to webpages, email messages, text messages, text documents, and so forth. A hyperlink may be associated with anchor text or an anchor image in a document.

The memory 814 may include a contact point module (or a set of instructions), a closest link module (or a set of instructions), and a link information module (or a set of instructions). The contact point module may determine the centroid or some other reference point in a contact area formed by contact on the touch screen. The closest link module may determine a link that satisfies one or more predefined criteria with respect to a point in a contact area as determined by the contact point module. The link information module may retrieve and display information associated with hyperlinks.

Each of the above identified modules and applications may correspond to a set of instructions for performing one or more functions described above. These modules (i.e., sets of instructions) need not be implemented as separate software programs, procedures or modules. The various modules and sub-modules may be rearranged and/or combined. Memory 814 may include additional modules and/or sub-modules, or fewer modules and/or sub-modules. Memory 814, therefore, may include a subset or a superset of the above identified modules and/or sub-modules. Various functions of the system may be implemented in hardware and/or in software, including in one or more signal processing and/or application specific integrated circuits.

Memory 814 may store an operating system, such as Darwin, RTXC, LINUX, UNIX, OS X, WINDOWS, or an embedded operating system such as VxWorks. The operating system may include procedures (or sets of instructions) for handling basic system services and for performing hardware dependent tasks. Memory 814 may also store communication procedures (or sets of instructions) in a communication module. The communication procedures may be used for communicating with one or more additional devices, one or more computers and/or one or more servers. The memory 814 may include a display module (or a set of instructions), a contact/motion module (or a set of instructions) to determine one or more points of contact and/or their movement, and a graphics module (or a set of instructions). The graphics module may support widgets, that is, modules or applications with embedded graphics. The widgets may be implemented using JavaScript, HTML, Adobe Flash, or other suitable computer program languages and technologies.

An I/O subsystem 840 may include a touch screen controller, a proximity controller and/or other input/output controller(s). The touch-screen controller may be coupled to a touch-sensitive screen or touch sensitive display system. The touch screen and touch screen controller may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen. A touch-sensitive display in some embodiments of the display system may be analogous to the multi-touch sensitive screens.

The other input/output controller(s) may be coupled to other input/control devices 842, such as one or more buttons. In some alternative embodiments, input controller(s) may be coupled to any (or none) of the following: a keyboard, infrared port, USB port, and/or a pointer device such as a mouse. The one or more buttons (not shown) may include an up/down button for volume control of the speaker and/or the microphone. The one or more buttons (not shown) may include a push button. The user may be able to customize a functionality of one or more of the buttons. The touch screen may be used to implement virtual or soft buttons and/or one or more keyboards.

In some embodiments, the system 800 may include circuitry for supporting a location determining capability, such as that provided by the Global Positioning System (GPS). The system 800 may include a power system 850 for powering the various components. The power system 850 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The system 800 may also include one or more external ports 824 for connecting the system 800 to other devices.

Portions of the present invention may be comprised of computer-readable and computer-executable instructions that reside, for example, in a processing system and which may be used as a part of a general purpose computer network (not shown). It is appreciated that processing system is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

It is noted that certain example embodiments of this invention relate to depth "pulling" in response to an input, and in particular pulling at least some displayed content forward toward a viewer in response to a user input. The content pulled forward may be removed from a rearward display screen and entirely moved to a front display screen for example, or alternatively may be displayed on both the front and rear screens in response to an input (as opposed to just on a rear screen), in various example embodiments of this invention.

In an example embodiment of this invention, there is provided a multi-layer display system, comprising: a first display screen and a second display screen arranged in a substantially parallel manner, the first display screen overlapping the second display screen; wherein the multi-layer display system is configured so that the first display screen is to be located between a user and the second display screen; a processing system comprising at least one processor and memory, the processing system configured to: display content on the first display screen; detect an input to the first display screen; determine an input location to the first display screen and content displayed on the first display screen proximate the input location; and display, on the second display screen, at least some of the content that was proximate the input location.

In the display system of the immediately preceding paragraph, the processing system may be configured to, when the input location corresponds to and/or is proximate a button displayed on the first screen, move display of the button from the first display screen to at least the second display screen in order to simulate pressing of the button.

In the display system of any of the preceding two paragraphs, the processing system may be configured to, when the input location corresponds to and/or is proximate a button displayed on the first screen, move display of the button from the first display screen to at least the second display screen and display the button on the second display screen, and remove display of the button from the first display screen after the input is maintained for at least a predetermined time period.

In the display system of any of the preceding three paragraphs, the processing system may be configured to display the button on the second display screen in an enlarged manner compared to how the button is displayed on the first display screen.

In the display system of any of the preceding four paragraphs, the first display screen may comprise a touch sensitive display, and the detected input may be a touch input to the touch sensitive display.

In the display system of any of the preceding five paragraphs, there may be a proximity detector for detecting proximity of an object to the first display screen, and wherein the input location may be determined based on data received from the proximity detector.

In the display system of any of the preceding six paragraphs, the content may be one or more of text, a button, an image, and a link.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

According to one exemplary embodiment, a multi-layer display system may include a plurality of display panels/screens arranged in an overlapping manner, a backlight configured to provide light to the plurality of display screens, and a processing system. The processing system may be configured to: display, on a first display screen of the plurality of display screens, a plurality of buttons, detect an input, and determine location of the input on the first display screen. When the determined location of the input corresponds to a location of one of the displayed buttons on the first display screen, the processing system may display a button on the second display screen corresponding the determined location of the input.

In another exemplary embodiment, non-transitory computer-readable storage medium having stored therein a program for execution by a processing system of a display system having at least first display screen and second display screen arranged in a substantially parallel and overlapping manner. The program, when executed, may cause the processing system to control a first display screen to display content including a plurality of buttons; detect an input; and determine location of the input on the first display screen. When the determined location of the input corresponds to a location of one of the displayed buttons on the first display screen, a button may be displayed on the second display screen corresponding the determined location of the input.

In another exemplary embodiment, a multi-layer display system may include a plurality of displays arranged in an overlapping manner, a backlight configured to provide light to the plurality of display screens, and a processing system. The processing system may be configured to: display on the first display content including a plurality hyperlinks; detect area of contact of a touch input to the touch screen of the first display; determine one or more links that are overlapped by the touch area of the touch input; and display, on the second display and while the content is displayed on the first display, information associated with the one or more links that are determined to be overlapped by the touch area of the touch input.

In another exemplary embodiment, a method of using a multi-layer display system may include having at least first display and second display arranged in a substantially parallel and overlapping manner; displaying on the first display content including a plurality hyperlinks; detecting area of contact of a touch input to a touch screen of the first display; determining one or more links that are overlapped by the touch area of the touch input; and displaying, on the second display and while the content is displayed on the first display, information associated with the one or more links that are determined to be overlapped by the touch area of the touch input.

In another exemplary embodiment, non-transitory computer-readable storage medium having stored therein a program for execution by a processing system of a display system having at least first display screen and second display screen arranged in a substantially parallel and overlapping manner. The program, when executed, may cause the processing system to display on the first display content including a plurality hyperlinks; detect area of contact of a touch input to a touch screen of the first display; determine one or more links that are overlapped by the touch area of the touch input; and display, on the second display and while the content is displayed on the first display, information associated with the one or more links that are determined to be overlapped by the touch area of the touch input.

The invention claimed is:

1. A multi-layer display system, comprising:
a first display screen and a second display screen arranged in a substantially parallel manner, the first display screen overlapping the second display screen;
wherein the multi-layer display system is configured so that the first display screen is to be located between a user and the second display screen;
a processing system comprising at least one processor and memory, configured to:
display content on the first display screen;
detect an input to the first display screen;
determine an input location to the first display screen and content displayed on the first display screen proximate the input location; and
when the input location corresponds to a button displayed on the first screen, move display of the button from the first display screen to the second display screen in order to simulate pressing of the button so as to display, on the second display screen, at least some of the content that was proximate the input location, wherein the selected content is displayed on the second display screen at a location offset from where it was displayed on the first display screen.

2. The display system according to claim 1, wherein the processing system is configured to, when the input location corresponds to a button displayed on the first screen, move display of the button from the first display screen to at least the second display screen and display the button on the second display screen, and remove display of the button from the first display screen after the input is maintained for at least a predetermined time period.

3. The display system according to claim 1, wherein the processing system is configured to display the button on the second display screen in an enlarged manner compared to how the button is displayed on the first display screen.

4. The display system according to claim 1, wherein the processing system is configured to display the content on the second display screen in an enlarged manner compared to how the content is displayed on the first display screen.

5. The display system according to claim 1, wherein the first display screen comprises a touch sensitive display, and the detected input is a touch input to the touch sensitive display.

6. The display system according to claim 1, further comprising a proximity detector for detecting proximity of an object to the first display screen, and wherein the input location is determined based on data received from the proximity detector.

7. The display system according to claim 1, wherein the content comprises one or more of text, a button, an image, and a link.

8. A multi-layer display system, comprising:
a first display screen and a second display screen arranged in a substantially parallel manner in different planes, the first display screen overlapping the second display screen;
processing circuitry configured to:
display content on the first display screen;
detect an input to the first display screen;
determine an input location of the input to the first display screen and content displayed on the first display screen proximate the input location; and
when the input location corresponds to a button displayed on the first screen, move display of the button from the first display screen to the second display screen in order to simulate pressing of the button so as to display, on the second display screen, content relating to the content that was proximate the input location, wherein the selected content is displayed on the second display screen at a location offset from where it was displayed on the first display screen.

9. The display system according to claim 8, wherein the first display screen comprises a touch sensitive display, and the detected input is a touch input to the touch sensitive display.

10. The display system according to claim 8, wherein the content comprises one or more of text, a button, an image, and a link.

11. A method of using a display system, the method comprising:
having a first display screen and a second display screen arranged in a substantially parallel manner, the first display screen overlapping the second display screen so that the first display screen is located between a user and the second display screen;

displaying content on the first display screen;

detecting an input to the first display screen;

determining an input location of the input to the first display screen and determining content displayed on the first display screen proximate the input location; and when the input location corresponds to a button displayed on the first screen, moving display of the button from the first display screen to the second display screen in order to simulate pressing of the button so as to display, on the second display screen, at least some of the content that was proximate the input location, wherein the selected content is displayed on the second display screen at a location offset from where it was displayed on the first display screen.

12. The method of claim 11, comprising moving display of at least part of the content proximate the input location from the first display screen to the second display screen.

13. The method of claim 11, wherein the content comprises a button.

14. The method of claim 13, comprising moving display of the button from the first display screen to the second display screen to simulate pressing of the button.

15. The method of claim 11, comprising displaying at least some of the content that was proximate the input location in an enlarged manner on the second display screen compared to how it is/was displayed on the first display screen.

16. The method of claim 11, wherein the first display screen comprises a touch sensitive display, and wherein the input is a touch input.

* * * * *